(12) United States Patent
Brennan

(10) Patent No.: US 8,010,214 B2
(45) Date of Patent: Aug. 30, 2011

(54) DIGITAL AUDIO PROCESSING

(75) Inventor: Martin John Brennan, Suffolk (GB)

(73) Assignee: GS IP Limited Liability Company, Wilmington, DE (US)

( * ) Notice: Subject to any disclaimer, the term of this patent is extended or adjusted under 35 U.S.C. 154(b) by 1129 days.

(21) Appl. No.: 10/291,988

(22) Filed: Nov. 12, 2002

(65) Prior Publication Data

US 2004/0093099 A1 May 13, 2004

Related U.S. Application Data

(63) Continuation of application No. PCT/GB01/02096, filed on May 14, 2001.

(30) Foreign Application Priority Data

May 12, 2000 (GB) .................................. 0011537.8

(51) Int. Cl.
G06F 17/00 (2006.01)
(52) U.S. Cl. ............................................. 700/94; 710/8
(58) Field of Classification Search .................... 360/60, 360/65–67, 75, 77.04; 369/1; 381/120
See application file for complete search history.

(56) References Cited

U.S. PATENT DOCUMENTS

| | | | | |
|---|---|---|---|---|
| 4,422,109 A | * | 12/1983 | Sampei et al. | 360/65 |
| 4,484,237 A | * | 11/1984 | Muto | 360/25 |
| 4,523,152 A | * | 6/1985 | Garde | 330/151 |
| 4,553,179 A | * | 11/1985 | Inami et al. | 360/66 |
| 4,663,610 A | * | 5/1987 | Metz et al. | 341/133 |
| 4,731,851 A | * | 3/1988 | Christopher | 381/104 |
| 4,745,298 A | * | 5/1988 | Iwamatsu | 307/38 |
| 4,796,247 A | | 1/1989 | Vogelsang | |
| 4,843,490 A | * | 6/1989 | Haragushi | 360/69 |
| 5,289,439 A | | 2/1994 | Koulopoulos et al. | |
| 5,349,575 A | | 9/1994 | Park | |
| 5,392,299 A | * | 2/1995 | Rhines et al. | 714/756 |
| 5,453,964 A | * | 9/1995 | Shimizume | 369/47.32 |
| 5,488,669 A | * | 1/1996 | Zampini et al. | 381/119 |
| 5,507,024 A | * | 4/1996 | Richards, Jr. | 455/260 |
| 5,544,130 A | * | 8/1996 | Mizuno et al. | 369/1 |

(Continued)

FOREIGN PATENT DOCUMENTS

EP 0-678-856 A 10/1995

(Continued)

OTHER PUBLICATIONS

Kenneth L. Short, Embedded Microprocessor Systems Design—An Introduction Using the Intel 80C188EB 18 (1998).*

(Continued)

*Primary Examiner* — Walter F Briney, III

(57) ABSTRACT

An audio processing unit for an integrated audio reproduction system comprising an audio data recovery device for recovering audio data from an audio data source, sound generation apparatus and a user input device for user input of audio processing control data, the audio processing unit comprising a digital processor provided on an integrated circuit and connected to the data recovery device, the sound generation apparatus and the user selection device and arranged to receive input audio data from the data recovery device, process the input audio data in the digital domain in accordance with the audio processing control data to generate an audio output signal, and provide the audio output signal to the sound generation apparatus, and to control at least one electromechanical function of the audio data recovery device.

23 Claims, 7 Drawing Sheets

U.S. PATENT DOCUMENTS

| | | | |
|---|---|---|---|
| 5,581,529 A | 12/1996 | Roth et al. | |
| 5,692,058 A | 11/1997 | Eggers et al. | |
| 6,028,944 A * | 2/2000 | Markow et al. | 381/120 |
| 6,107,876 A * | 8/2000 | O'Brien | 330/10 |
| 6,301,366 B1 * | 10/2001 | Malcolm et al. | 381/119 |
| 6,446,233 B1 * | 9/2002 | Dadurian | 714/752 |
| 6,621,346 B1 * | 9/2003 | Nabicht et al. | 330/284 |

FOREIGN PATENT DOCUMENTS

| | | |
|---|---|---|
| WO | WO98-43243 A | 10/1998 |

OTHER PUBLICATIONS

International Preliminary Examination Report for PCT Pat. App. PCT/GB01/02096.

International Search Report for PCT Pat. App. PCT/GB01/02096.

Search Report, Counterpart Great Britain Patent Application No. GB 0011537.8, Oct. 12, 2001.

Official Notice of Rejection, Japanese Patent Application No. 2001-582781, Dec. 17, 2010.

* cited by examiner

DIGITAL AUDIO PROCESSING

This application is a continuation of International Application No. PCT/GB01/02096, having an international filing date of 14 May 2001, which itself claims priority to United Kingdom Application No. GB 0011537.8, filed 12 May 2000.

BACKGROUND OF THE INVENTION

1. Technical Field

This invention relates to digital audio processing, for example for use in audio reproduction systems such as hi-fi systems.

2. Description of Related Art

Hi-fi systems can be built up by a user from individually boxed components such as radio tuners, cassette player/recorders, compact disc (CD) players, amplifiers and loudspeakers. The components are connected together so that audio signals can be passed between them in analogue form, from a source component to an amplifier and then to loudspeakers. Systems of this sort are generally expensive, because of the need for separate enclosures, power supplies and circuitry for each component.

In an integrated hi-fi system all of the components except often the loudspeakers are integrated in a single enclosure. However, within that enclosure there is generally little integration at a circuit level between the components, other than the sharing of a power supply. An integrated hi-fi system typically comprises a number of audio source devices, such as radio tuners, cassette player/recorders and compact disc (CD) players, each of which has dedicated electronic circuitry for performing processing associated with its particular functions. For example, a typical radio tuner will have circuitry for demodulating, decoding and equalising received signals, a cassette deck will have circuitry for equalising data recovered from cassette tape in accordance with the type of the tape, and a CD player will have circuitry for error correction and detection and control of tracking and focus errors. From each of these sections of the system analogue audio signals are produced. These signals are fed to common circuitry for allowing features of the signal such as volume and tone to be controlled in the analogue domain, resulting in an analogue output signal that is fed to amplifiers and loudspeakers.

Such integrated systems are complex to manufacture. The circuitry to support the audio devices, in addition to user interface devices such as switch matrices, infra-red remote controllers and displays, involves many separate components, which have to be mounted on circuit boards in such a way that they can be fitted into a single enclosure. As a result, the component and manufacturing costs of such systems are relatively expensive; and if there is a fault, finding which of the many components is damaged can require time consuming and technically demanding testing.

BRIEF SUMMARY OF THE INVENTION

According to the present invention there is provided an audio processing unit for an integrated audio reproduction system comprising an audio data recovery device for recovering audio data from an audio data source, sound generation apparatus and a user input device for user input of audio processing control data, the audio processing unit comprising a digital processor provided on an integrated circuit and connected to the data recovery device, the sound generation apparatus and the user selection device and arranged to receive input audio data from the data recovery device, process the input audio data in the digital domain in accordance with the audio processing control data to generate an audio output signal, and provide the audio output signal to the sound generation apparatus, and to control at least one electromechanical function of the audio data recovery device.

Preferred aspects of the present invention are indicated in the dependant claims.

BRIEF DESCRIPTION OF THE DRAWINGS

The present invention will now be described by way of example, with reference to the accompanying drawings, in which.

In the drawings, like reference numerals indicate like parts.

DETAILED DESCRIPTION OF THE INVENTION

Figure 1A:
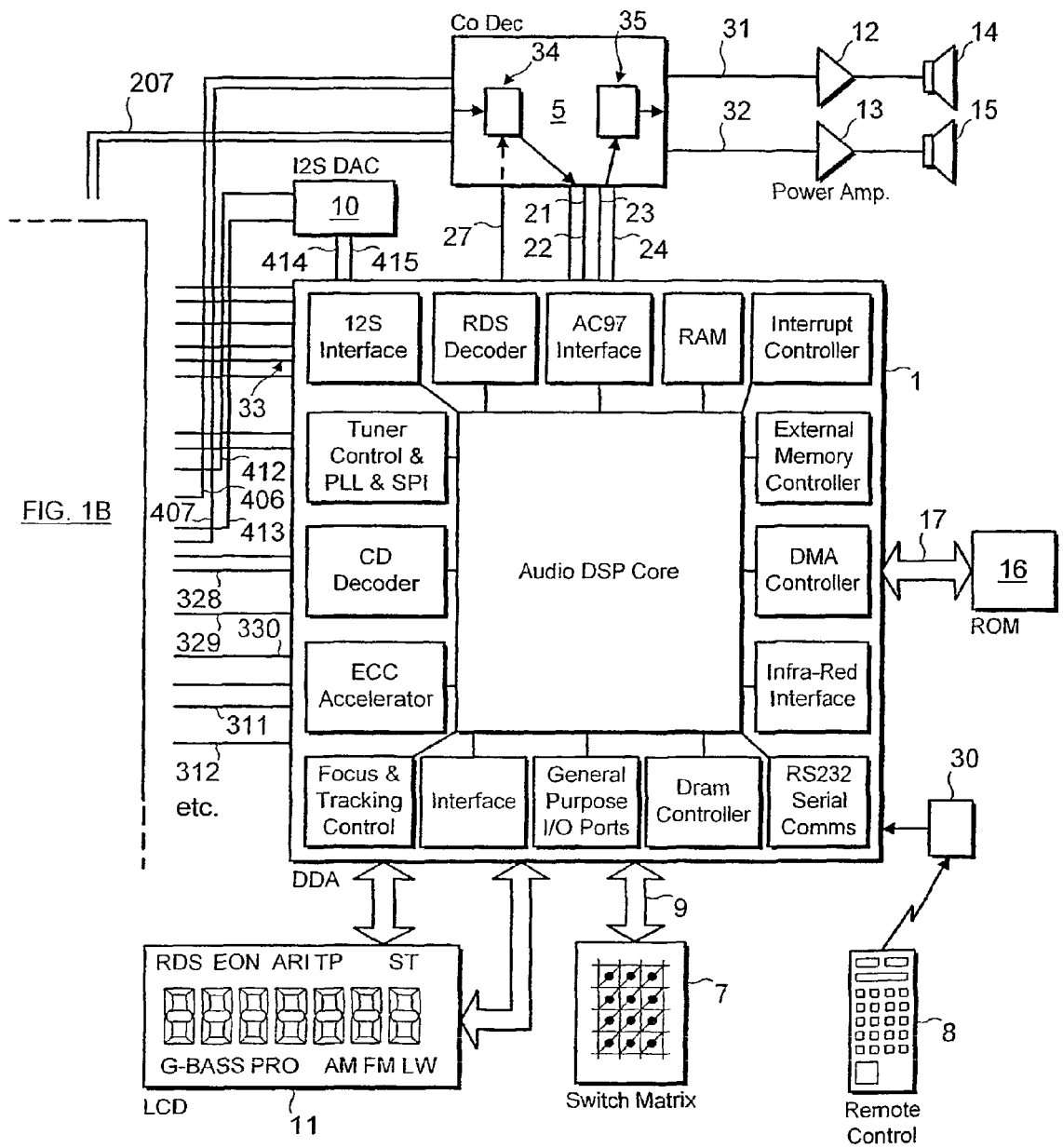
FIG. 1 shows the architecture of an audio system.
Figure 1B:
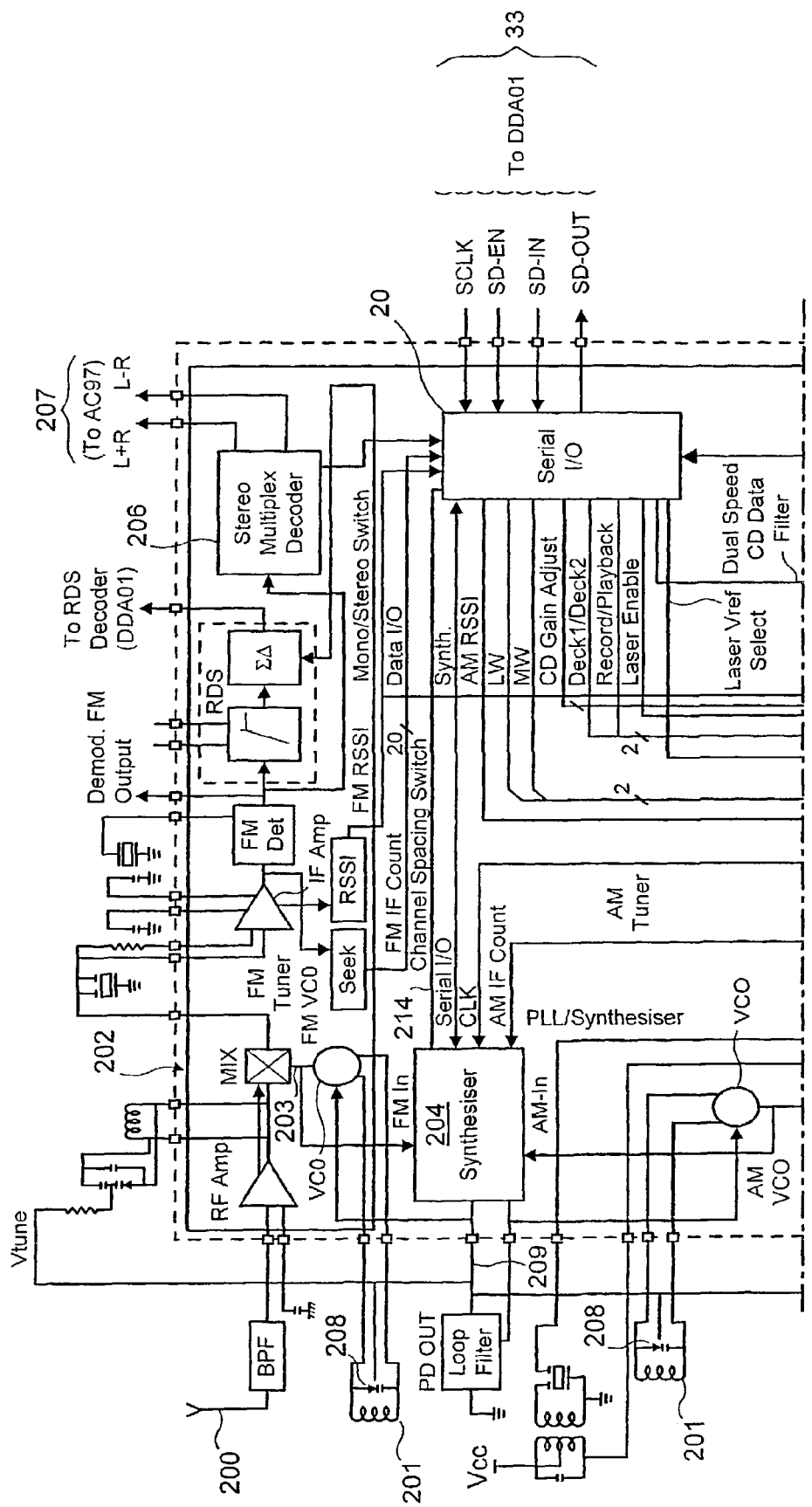
Figure 1B:
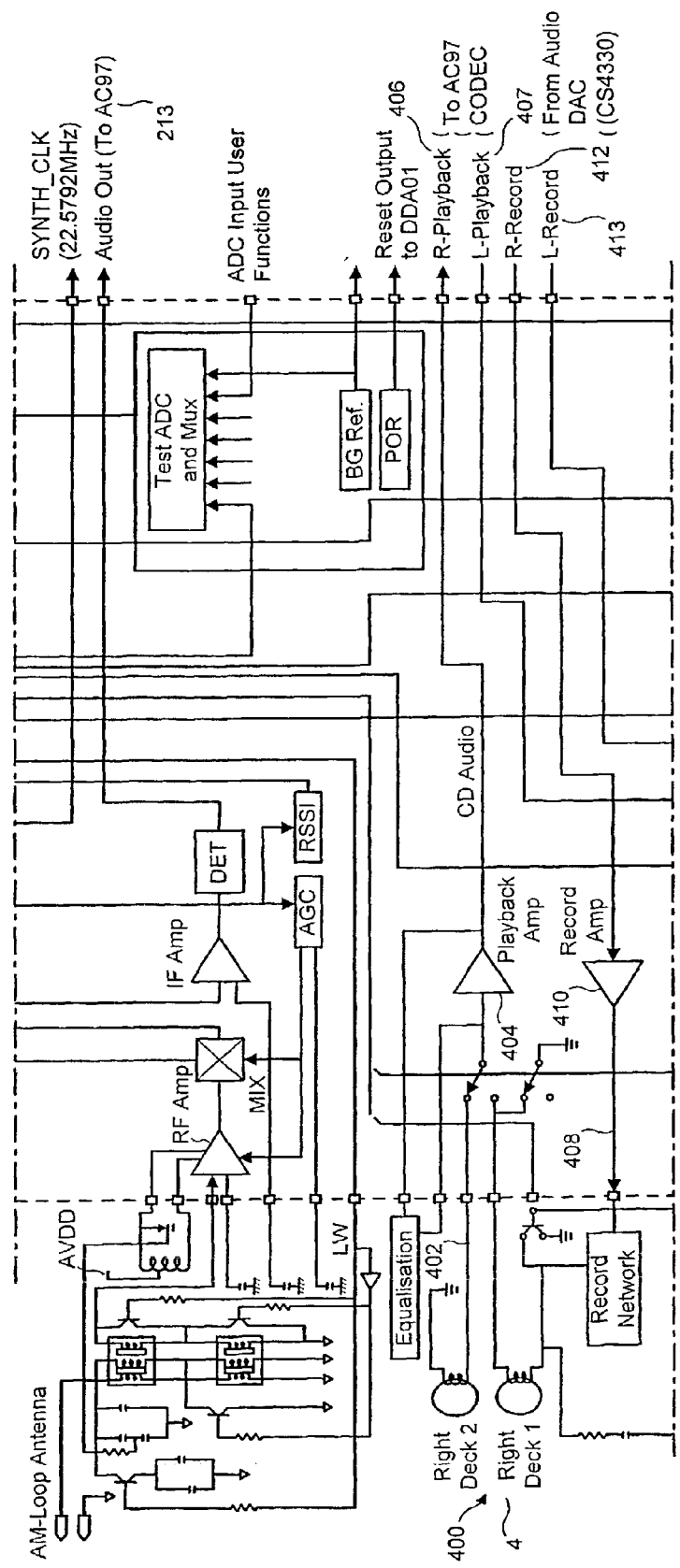
Figure 1B:
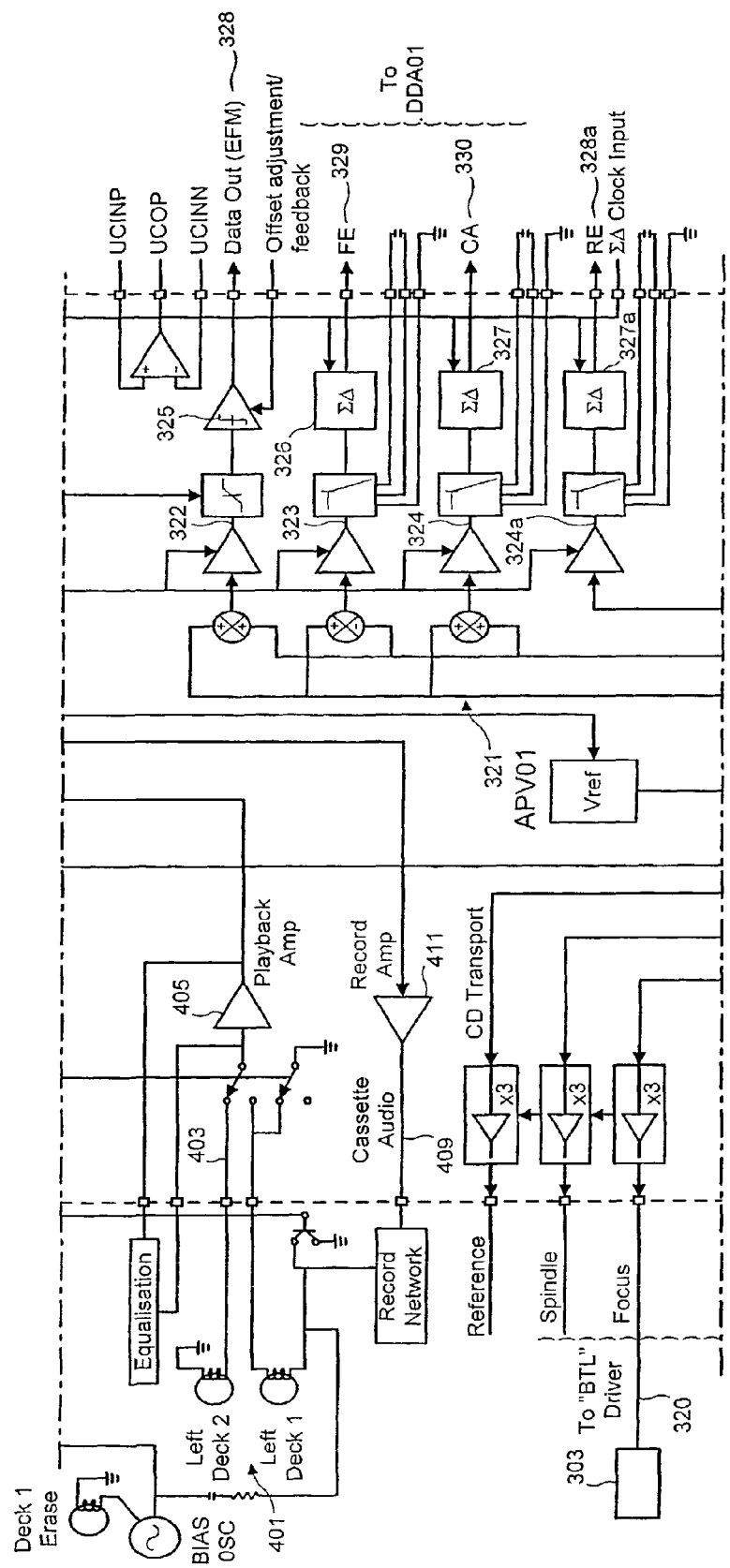
Figure 1B:
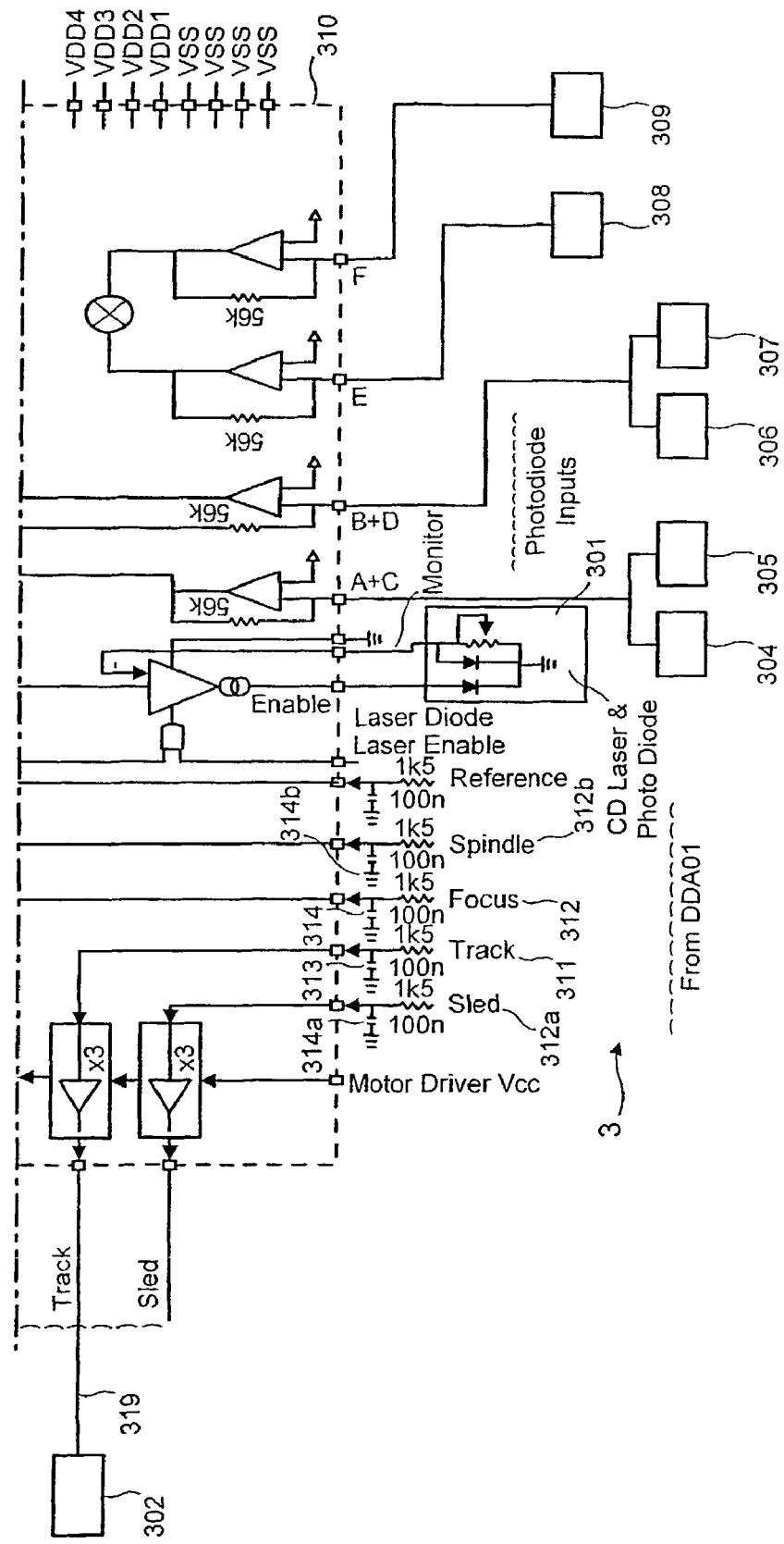

The audio system of FIG. 1 is intended for sound reproduction, for example as a domestic hi-fi system. The audio system comprises audio source devices, control devices and output devices all connected by way of a central microprocessor 1. The central microprocessor performs processing of signals from all audio sources, including analogue audio, sources in the digital domain, and interfaces with user interface devices such as a switch matrix and an infra-red remote controller. The use of a central microprocessor in this way provides significant advantages over the prior designs of audio system as described above, allowing a much greater level of integration. As a result, fewer components are required, manufacturing and testing is easier, and the size and cost of the resulting system can be reduced. Furthermore, with a system of this type it can be possible to define the functionality of the system by means of software, so that a single hardware unit can be manufactured in quantity and adapted for specific implementations by means of the software running on it.

The audio source devices are a radio tuner, a compact disc player shown generally at 3 and a cassette player and recorder shown generally at 4. Further devices such as (but not limited to) DVD, or MP3 players and/or recorders, television receivers and microphones could also provide audio input.

The radio tuner comprises FM (frequency modulation) antenna 200 and AM (amplitude modulation) antenna 201. Signals from the FM antenna are demodulated in the FM demodulation section 202 by means of mixing with a tuning signal at 203 which is derived from a synthesizer 204 under the control of the central microprocessor 1; and decoded into left and right stereo signal by stereo decoder 206. The resulting analogue audio signals are passed at 207 to codec unit 5. Variable capacitance diodes 208 are used to tune the AM reception under the control of a tuning signal at 209 which is derived via synthesizer 204 from a serial controller 20. The received AM signals are decoded to yield an analogue audio signal which is passed at 213 to codes unit 5. Selection of FM or AM reception is by means of signal switching under the control of selection signal 214 from the serial controller 20. Thus the radio tuner section is capable of receiving signals at a selected FM or AM frequency under the control of serial controller 20, and generating audio output signal(s) which are passed to the codec unit 5.

The compact disc (CD) player 3 has conventional data detection hardware comprising a pair of laser diodes 301, tracking and focus motors 302, 303 and six detection diodes 304-309. The laser diodes are enabled by an enable signal at 310 from the serial controller 20. The tracking, focus, sled and spindle drives are controlled by noise shaped DAC digital control signals 311, 312, 312a and 312b from the central microprocessor. Each of those control signals is converted to analogue by low-pass filter R-C network 313, 314, 314a, 314b to provide a respective drive signal at 319, 320. Outputs from the detection diodes 304-309 are amplified and passed to a decoding unit 321 including low pass filters and sum/difference circuitry to generate four analogue outputs at 322-324, 324a. These are converted to digital bitstreams by sigma-delta modulators 325-327, 327a to form four digital signals at 328-330, 328a which are passed to the central microprocessor 1. The four bitstreams are used for recovering the data read from a CD and for bringing the reading head into proper focus and tracking alignment with the CD. Thus, when enabled by serial controller 20 the CD player is capable of reading a CD under the control of digital signals 311, 312, 312a, 312b from the central microprocessor and returning digital data bitstreams to the microprocessor. The driving of the CD and its carrying tray is performed normally by motors which are not shown in FIG. 1.

The cassette player/recorder 4 has a pair of left 400 and right 401 read/write tape heads. The tape read outputs 402, 403 from the heads are amplified by amplifiers 404, 405 and are then passed at 406, 407 as left and right analogue audio signals to codes unit 5. Tape record inputs 408, 409 to the heads are generated by amplifiers 410, 411 from signals at 412, 413 received from I.sup.2S interface 10. The I.sup.2S interface generates the analogue signals 412, 413 from digital signals at 414, 415 from the microprocessor 1 which are digital representations of left and right audio data. Thus, the cassette player/recorder is capable of reading a cassette tape to generate audio signals at 406, 407 to codec unit 5, and of recording on a cassette tape analogue data derived from digital signals at 414, 415 from the microprocessor. The driving of the cassette tape by a motor (not shown), and the operation of an erase head (not shown) is performed normally. More than one cassette mechanism may be supported. Where more than one cassette mechanism is provided, one mechanism may be capable of recording playback from another mechanism.

Serial controller 20 is connected to microprocessor 1 by a serial interface 33. By means of signals sent over that link the microprocessor can control the various outputs of the serial controller.

The control devices of the audio system are switch matrix 7 and remote control handset 8. The switch matrix 7 is fixed to a user-operable keypad. Switch matrix 7 is connected directly to microprocessor 1 by a parallel interface 9. Remote control handset 8 transmits infra-red signals which are received by an infra-red receiver 30 connected to microprocessor 1.

The output devices of the audio system are an LCD (liquid crystal display) display block 11 connected directly to the microprocessor 1 and an audio output section comprising left and right power amplifiers 12, 13 and left and right loudspeakers 14, 15. The display may be driven via an external display controller. This may be especially convenient for displays of other technologies, for instance vacuum fluorescent displays or cathode ray tubes. The power amplifiers are driven by left and right analogue audio out signals at 31, 32 from codec 5.

A read only memory (ROM) 16 is connected by a bus 17 to the microprocessor 1. The ROM stores software for execution by the processor.

The codec 5 and I.sup.2S interface 10 perform D-to-A and A-to-D conversion. The codec 5 has connections to the microprocessor 1 for carrying left and right digital audio input signals to the microprocessor (connections 21,22) and for carrying left and right digital audio output signals from the microprocessor 1 (connections 23,24). The codec has connections 207, 406, 407 for receiving analogue signals from the radio tuner and the cassette player/recorder, and connections 31, 32 for providing output signals to the power amplifiers 12, 13. The codec also receives a source selection signal at 27 from the microprocessor 1. In response to the source selection signal an A-to-D path 34 in the codec can encode analogue signal(s) from a selected one of the audio sources 2, 4 to generate the left and right digital audio input signals to the microprocessor 1. Simultaneously a D-to-A path 35 in the codec can decode the left and right digital audio output signals from the microprocessor to generate the analogue outputs to the power amplifiers. A standard encoding/decoding scheme is used by the codec. 12S interface 10 has connections 414, 415 to the microprocessor 1 for receiving digital signals in I.sup.2S format representing left and right digital audio signals. The I.sup.2S interface 10 converts those signals to analogue form and outputs them at 412, 413 to the cassette player/recorder for recording.

The architecture of FIG. 1 includes four integrated circuits. One carries the serial controller 20 and the dedicated circuitry for supporting the operation of the radio tuner 2, compact disc player 3 and cassette player/recorder 4. Another carries the I.sup.2S interface 10. Another carries the codec 5. The fourth carries the microprocessor 1. Any or all of these may be integrated so that fewer separate integrated circuits are needed. All of the components of the audio system are preferably mounted in a single enclosure, with the exception of the speakers 14, 15, which may be in separate boxes, and the remote control handset 8.

In operation a user selects an audio source using the remote control handset 8 or the switch matrix 7. Left and right channel audio signals from that audio source are provided in digital form to the microprocessor, either in a bitstream format directly from the detection circuitry (if the CD player is the selected source) or in an encoded digital audio format via the codec 5 (if the radio tuner or the cassette player/recorder is selected). In the microprocessor the digital signals are processed as will be described below, for example for volume, tone, equalisation and error correction, to generate left and right channel output signals in digital form at 23, 24. Those signals are then converted to analogue form and used to drive the speakers to give an audible representation of the signals from the data source. If the user selects that the cassette player/recorder is to record data from one of the other audio sources then the microprocessor outputs the signals for recordal in digital form at 28, 29 after D-to-A conversion by I.sup.2S interface 10 a representation of the signals is then recorded by the cassette player/recorder. It should be noted that even if the selected source inherently generates analogue signals, as for example do the radio tuner and the cassette deck, their outputs are converted to digital form for digital processing in the processor 1 before being returned to the analogue domain for output to the loudspeakers.

Figure 2:
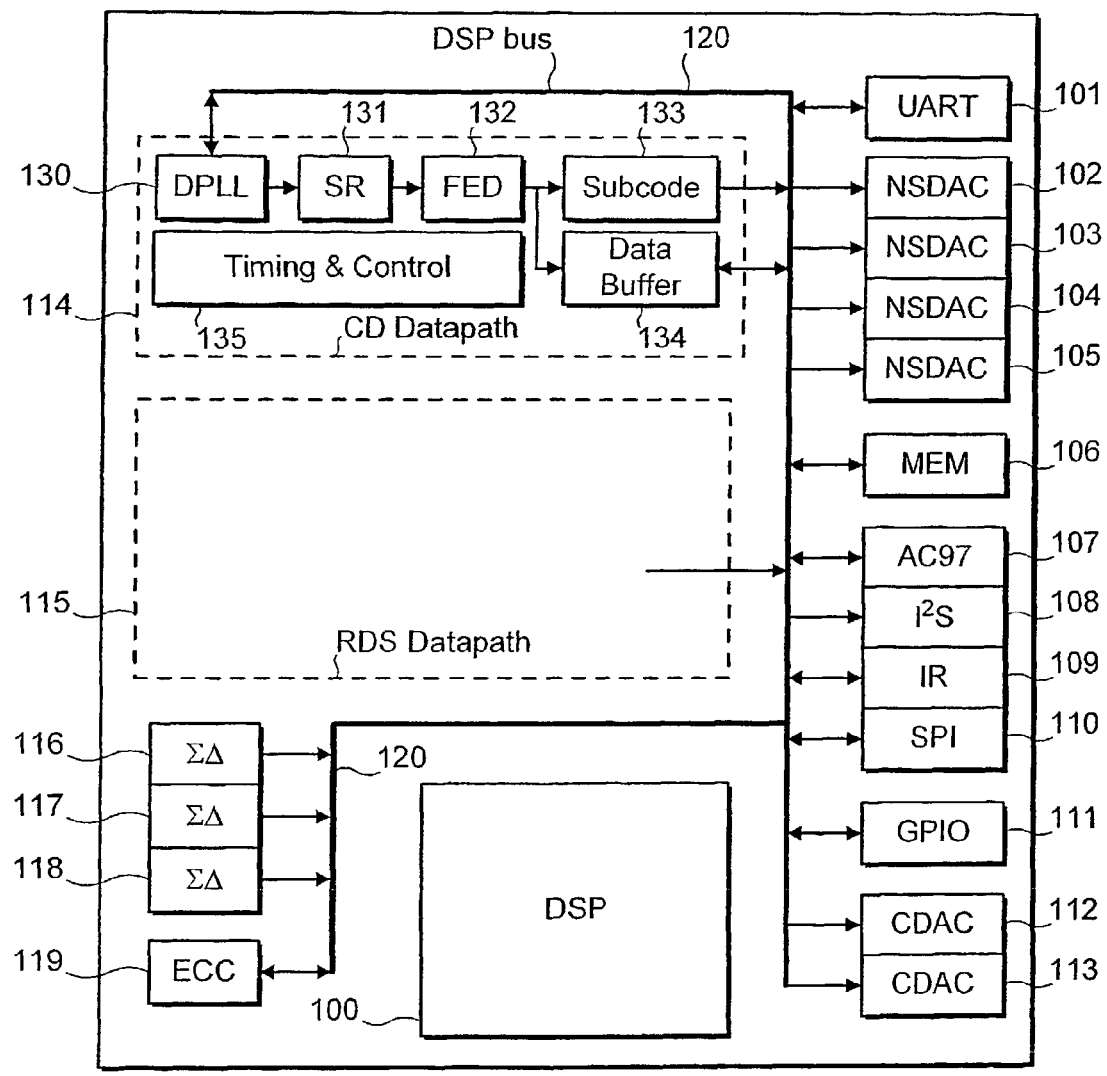
FIG. 2 shows the architecture of an integrated circuit for use in the system of FIG. 1.

FIG. 2 shows the architecture of the microprocessor 1. The microprocessor includes a multi-purpose digital signal processor (DSP) 100 and a series of dedicated hardware units 101-119. The processor 100 operates to load and execute program code stored in ROM 16. The dedicated hardware units comprise an array of input/output interfaces 101-113, a CD processing sub-system 114, an RDS (radio data system) processing sub-system 115, sigma-delta input circuits 116-

118 and an error correction accelerator sub-system (ECC) 119. The processor 100 and the dedicated hardware units are interconnected by a bus 120. The microprocessor is thus divided into a general purpose processing section represented by DSP 100, which performs processing in software, and a set of dedicated processing blocks (in particular sub-systems 114, 115 and 119) which perform processing in hardware. The split of the microprocessor in this way significantly enhances its performance.

The input/output interfaces are as follows:

UART 101 is a standard RS232 style asynchronous serial receiver transmitter. It uses eight bit data with one start bit and one stop bit. Its purpose is mainly for development but it could be used in manufacture for self test and diagnosis.

The four NSDACs (Noise Shaped DACs) 102-105 allow the microprocessor 1 to provide up to four pulse width modulated outputs. In the system of FIG. 1 these are used for controlling the focus and tracking actuators and the spindle and sled motors of the CD system. The NSDAC logic produces a bitstream whose average value is set by the DSP. A reference output is used to eliminate any offsets so that zero output results in zero drive to the actuator.

The memory controller 106 controls the timing and data flow to external memory 16 or other similar peripherals that may be connected to the microprocessor in other implementations. The system notionally decodes three banks of external memory: the boot ROM, static RAM and dynamic RAM although the boot ROM and Static RAM decodes could be further divided for external peripherals. The timing, width (byte or word) and the number of columns in the DRAM can be programmed independently. The processor can run code from fast internal RAM as well as slower boot ROM which gives it the characteristics of a DSP and a micro-controller. In use, when the microcontroller is first activated the software stored in ROM 16 may be downloaded to local random access memory on the microprocessor.

The AC97 interface 107 provides an interface to the codec 5, which in this implementation is an AC97 codec. The codec 5 has 16 bit stereo ADCs and DACs as well as independent adjustment of gain on five stereo inputs and the stereo output. Communication with the AC97 is via a 256 bit packet operating at 256 times the audio sample rate. The AC97 interface 107 allows the DSP 100 to communicate with the AC97 by reading and writing registers at the 44.1 kHz audio sample rate.

The I.sup.2S port 108 provides a link to the I.sup.2S interface 10. I.sup.2S is a standard form of serial interface for CD quality DACs. As described above, this interface may be used to record audio to tape while the main AC97 audio output drives the power amplifiers (at variable tone and volume settings).

The infra-red input 109 is connected to infra-red detector 30. The input port 109 measures the time between specified infra red transitions to detect and interpret an infra-red command, and then interrupts the processor 100 so the infra-red command can be processed. By this means the infra-red handset can provide a user with the normal controls such as volume adjustment, audio source selection, radio band and channel selection, tone adjustment and tape and CD position and play control.

The serial interface (SPI) 110 is connected to the serial link 33 and allows the DSP 100 to communicate with serial controller 20. By means of this interface the DSP 100 can issue commands to control the outputs of the serial controller 20. This provides a convenient way for the operation of the radio tuner and the CD player to be controlled without the need for the microprocessor 1 itself to have direct links to those devices. To enable the CD player, the DSP 100 sends a signal over bus 120 to the SPI 110 to cause the SPI to transmit a CD enable signal over serial link 33. The serial controller stores a CD enable flag. On receiving the CD enable signal the serial controller sets the CD enable flag and enables the CD by means of the output signal at 310. To disable the CD player, the DSP 100 sends a signal over bus 120 to the SPI 110 to cause the SPI to transmit a CD disable signal over serial link 33. On receiving the CD disable signal the serial controller resets the CD enable flag and disables the CD by means of the output signal at 310. Similarly, the serial controller stores flags for operations of the radio tuner 2, such as a tuner enable flag and a band selection flag, which are controlled by corresponding messages from the SPI 110. Additional flags can be stored and additional functions provided by the serial controller 20. This arrangement allows the number of outputs from the microprocessor 1 to be reduced. Instead of the microprocessor itself having individual output pins for each of the signals provided by the serial controller 20, there is a simple serial interface between the microprocessor 1 and the serial interface 20.

The general purpose I/O (GPIO) block 111 represents a number (e.g. 64) of general purpose I/O pins. These can be used as inputs or outputs. They could be used for driving displays, reading switches or (relatively) slow communication with peripherals. GPIO block is connected to switch matrix 7 and display 11. Because a large number of pins is provided, each of which can be independently controlled by the DSP 100 under software command, the GPIO block provides a convenient means for allowing the microprocessor to be adapted for different implementations which might have different display units and different switch inputs. Once the GPIO block has been connected to those devices, the interaction between the DSP 100 and the devices is dependant on the software that is used.

The cassette noise shaped DAC (CDAC) 113 is intended to allow manufacturers of hi-fi systems that use the microprocessor 1 to provide a lower cost tape recording solution. The structure of the block is the same as the NSDAC but these blocks run at 44.1 KHz. If the CDAC outputs are used then no external I.sup.2S DAC is required, and the cassette recording signals at 412, 413 in FIG. 1 can be provided directly from the CDAC 113 of the microprocessor 1. This can reduce circuit board area, component count and manufacturing cost.

The CD processing sub-system 114 performs decoding of data received from the CD player 3 to derive the audio data recovered from a CD. The CD processing sub-system 114 comprises digital phase locked loop (DPLL) 130, shift register (SR) 131, fourteen-to-eight decider (FED) 132, subcode module 133, data buffer 134 and a timing and control module 135 which controls the units 130-134. The digital phase locked loop 130 recovers the hit clock from the CD data. Transitions in the CD data should occur on clock transitions. This logic synthesises a recovered clock and if the data is early or late either increases or decreases the recovered clock frequency to compensate. The recovered clock is synchronous to the system clock. This introduces a jitter of +/− half system clock period. With a 67 MHz-system clock this represents about 1% of the minimum interval between data transitions. The DPLL frequency can be read by the DSP to control the speed of the disk. The DPLL initial frequency and the gain in the proportional and integral feedback paths can all be set by the DSP to control acquisition time and stability. The shift register converts the serial data from the disk into parallel symbols. It is also used to detect synchronisation symbols. The fourteen-to-eight decoder transforms data from the fourteen bit format in which it is stored on a CD into an eight bit (byte) format for use in the DSP 100. When CD data is recorded each eight bit byte is encoded onto fourteen channel bits. Each channel bit corresponds to a transition in the recorded data. The FED therefore translates each set of fourteen received channel bits into a single eight bit byte of audio data. The recovered bytes are passed to the subcode module and to the data buffer. The subcode module 133 detects subcode synchronisation symbols and extracts the subcode byte from every received frame. The subcode module is connected to the data bus 120 for outputting the subcode information. The data buffer 134 buffers the received audio data for improving the efficiency of de-interleaving, which is performed by the DSP 100. Data from the CD is written into one of three buffers in the data buffer 134 in turn. Each of those buffers accommodates 32 bytes, or one frame of received audio data. The data buffer 134 is connected to the bus 120, by means of which the DSP 100 can access the buffers of the data buffer 134. The data buffer 134 is configured so that the DSP cannot access the buffer to which received data is currently being written, but can access the previous two buffers to which data was written. This allows the DSP to execute the first stage of de-interleaving without copying the data.

The RDS processing subsystem 115 extracts RDS data from received radio signals and provides the RDS data at the bus 120.

There are three Sigma Delta ADCs 325-327 in the CD system 3 (see FIG. 1) which provide signals representing focus error 328, tracking error 329 and central aperture 330. These signals are each in the form of a bitstream which represents the magnitude of the respective signal. Each of the sigma delta inputs 116-118 is connected to a respective one of the ADCs 325-327. The sigma delta inputs repeatedly count the binary ones in the respective bitstream over a preset sample period, and provide the result of each count to the data bus 120. The results can be used by the DSP 100 for determining focus and tracking error so as to control the focus and radial servos 303, 302 by means of two of the NSDACs 102-105. The results (particularly of the central aperture count) can also be passed over bus 120 to the DPLL 130, as the basic data input to the CD sub-system 114.

The DSP 100 performs Reed-Solomon error correction of data received from the CD sub-system 114 under the control of software from ROM 16. In the course of the error correction operation the DSP 100 is required to determine syndromes for the received data. This could be performed in software, but to "add" one byte to a current syndrome would take around 20 instructions in software. At CD data rates this would consume around 10 million instructions of the DSP 100 per second. The error correction accelerator (ECC) block is provided to accelerate the process. The ECC block can communicate with the DSP 100 over data bus 120. The ECC block implements syndrome calculation and in response to a message from the DSP 100 indicating . . . returns a message indicating the byte that is to be added to the current syndrome. This accelerates the task of syndrome computation by reducing the load on the DSP 100 for syndrome determination to one instruction per received data byte.

The DSP 100 operates at a clock speed of 67 MHz, but other rates could be used. The DSP 100 is a general purpose processor which operates under software control to receive data over bus 120, process it and output data over the same bus.

Figure 3:
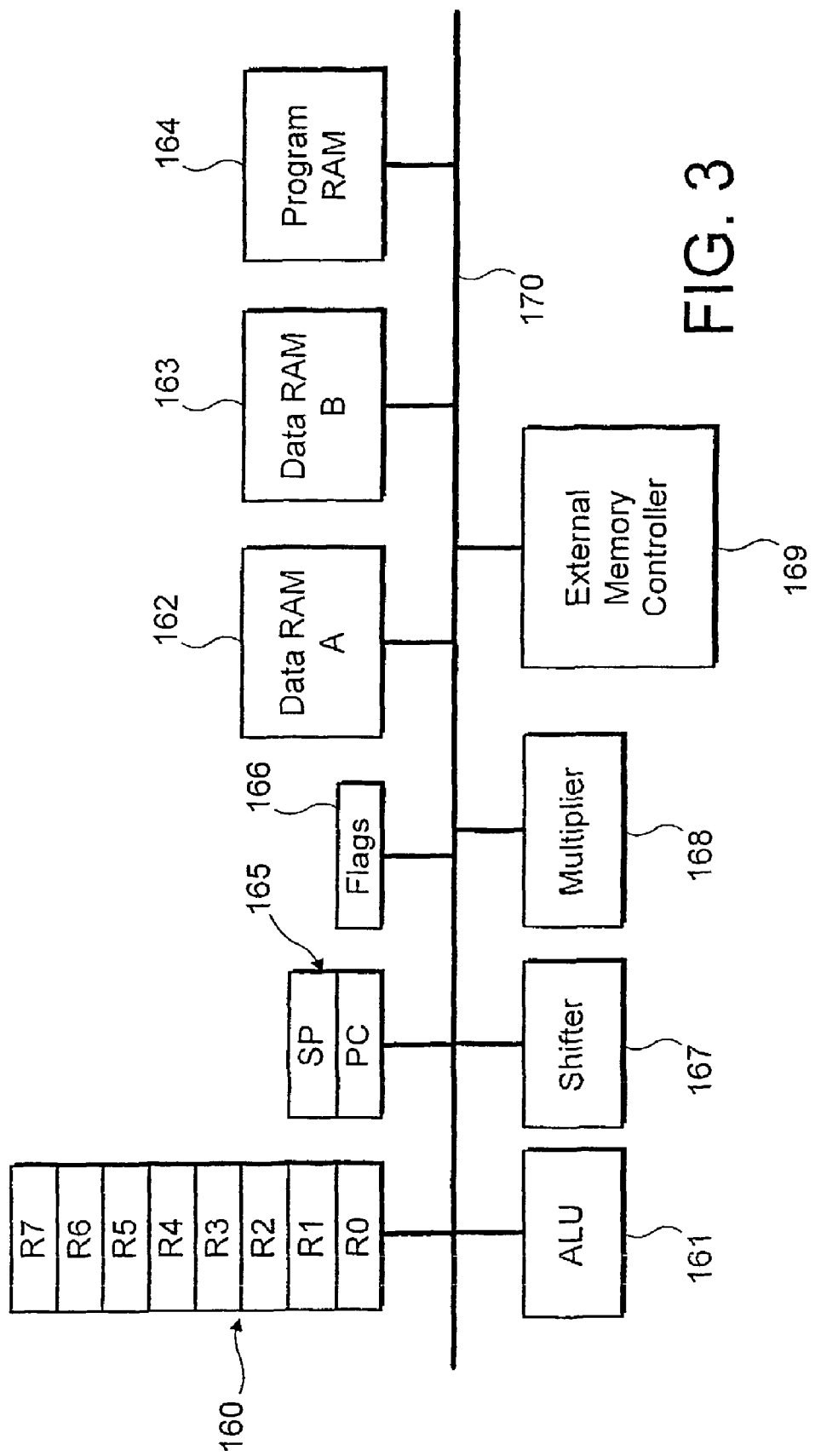
FIG. 3 illustrates the architecture of the digital signal processor of the integrated circuit of FIG. 2.

The architecture of the DSP 100 is shown in FIG. 3. The DSP has eight 32 bit registers 160. These can be used to hold addresses or data. When a register is used to provide an address it is combined with a five bit offset (indexed addressing) allowing single cycle access to small data structures. The DSP 100 includes a 32 bit arithmetic logic unit (ALU) 161. RAM 162-164 for the DSP 100 could be provided on the integrated circuit of microprocessor 1 or on external RAM chips. The RAM may be a mixture of SRAM and DRAM. There are three banks decoded by the external memory controller, two static and one dynamic. The speed and width of each bank may be independently adjusted. External memory may be 8 or 16 bits wide. The external memory controller conceals this to an extent and allows 8 or 16 bit access to the external memory. After reset the processor executes instructions from one hank of static memory. It is intended that code for speed critical operations (like digital filters) be transferred into and executed from fast internal program RAM while code for slow operations (like the user interface) be executed directly from the boot EPROM. In addition, the DPS includes SP and PC registers 165, flag stores 166, a dedicated bit shifter unit 167, a dedicated multiplier unit 168 and an external memory controller 169. The blocks of the DSP are connected by bus 170.

In operation, a user enables the audio system of FIG. 1 by turning on power to the system. With the exception of the remote control handset 8, which is battery-powered, all the apparatus in the audio system has a common power supply (not shown in the figures), although different components of the system may have different power voltages derived from that power supply. When it is turned on the microprocessor 1 boots up and loads operating software from ROM 16. To increase the speed of execution the software may be stored in local RAM. By means of the switch matrix 7 and/or the remote control 8 the user can provide to the DSP 100 data indicating the following information:

which of the audio input units 2, 3, 4 is to provide the audio source for replay through the speakers 14, 15;

if the source is the CD or tape player, whether the unit is in play, or pause or stop mode, or is to index forwards or backwards.

the settings of volume, tone and other processing effects with which the sound is to be replayed;

whether the sound is also to be recorded by the cassette player/recorder 4.

Other information may also be provided. The user's settings are provided to the GPIO block 111 of the microprocessor 1, and thence via the bus 120 to the DSP 100 which stores the settings in RAM so that they are available during execution of software.

If the radio tuner is selected as the audio source then the DSP 100 transmits the appropriate tuner enable and selection signals to serial controller 20 via port 110. The tuner is then enabled by the serial controller 20. Analogue audio signals from the tuner are converted into the digital domain by codec 5 and provided to the AC97 interface 107. From there the digital signals are passed over bus 120 to DSP 100 which transforms them under control of its program software in accordance with the user's settings for volume, tone etc. In addition, and particularly if FM radio signals are being received, the digital audio signals are subjected to frequency equalisation to account for any compression or the like that may be in use for transmission of the signals. The software of the DSP 100 includes one or more preset processing routines for radio equalisation and the appropriate routine is used to equalise the received audio data. The resulting signals are output to the codec 5 via the AC97 interface 107. The AC97 interface converts the signals back into the analogue domain and outputs them to the amplifiers and speakers 12-15.

If the CD player is selected as the audio source then the DSP 100 transmits the appropriate CD player enable and selection signals to serial controller 20 via port 110. The CD player is then enabled by the serial controller 20. Meanwhile, the DSP 100 controls the servos of the CD player directly via NSDACs 102-105. Raw bitstream data from the CD player is received by the microprocessor 1 at sigma delta inputs 116-118. By means of the data bus 120 this data is provided to DSP 100 and to the CD sub-system 114. The DSP uses the data to determine any tracking or focus error and adjusts the outputs to the tracking and focus servos accordingly. Meanwhile, the CD sub-system decodes the received data into eight bit bytes which are stored in the buffers of the data buffer 134. The DSP 100 reads from those buffers as described above, to perform de-interleaving of the received data, and then performs error correction on the received data to yield the pulse code modulated digital audio data from the CD. That data may then by converted by the DSP 100 into another digital audio form. The digital audio data from the is then transformed by the DSP 100 under control of its program software in accordance with the user's settings for volume, tone etc. The resulting signals are output to the codec 5 via the AC97 interface 107. The AC97 interface converts the signals back into the analogue domain and outputs them to the amplifiers and speakers 12-15.

If the cassette player/recorder is selected as the audio source then the DSP 100 transmits the appropriate cassette player/recorder enable and selection signals to serial controller 20, via port 110. The cassette player/recorder is then enabled by the serial controller 20 by means of signals not shown in FIG. 1. Analogue audio signals from the cassette player/recorder are converted into the digital domain by codec 5 and provided to the AC97 interface 107. From there the digital signals are passed over bus 120 to DSP 100 which transforms them under control of its program software in accordance with the user's settings for volume, tone etc. In addition, the digital audio signals are subjected to frequency equalisation to account for the type of cassette tape in use. The type of tape may be input by the user or detected by the tape deck and provided to the microcontroller via interface 111. The software of the DSP 100 includes preset processing routines for tape equalisation and the appropriate routine is used to equalise the received audio data. The resulting signals are output to the codec 5 via the AC97 interface 107. The AC97 interface converts the signals back into the analogue domain and outputs them to the amplifiers and speakers 12-15.

If the user has indicated that the cassette player/recorder is to record from the selected audio source then in addition to being output to the codec 5 via the AC97 interface 107 the resulting signals are output to the I.sup.2S interface 10 via I.sup.2S port 108. In the I.sup.2S interface the signals are converted back into the analogue domain and output to the cassette player/recorder. The signals as output to the I.sup.2S interface may not be subject to some of the processing used on signals to the codec 5. For example, volume and tone processing may be not applied to them. It is preferred that the appropriate tape type equalisation is applied to the signals.

In addition to the audio processing described above, the DSP 100 provides outputs to the display to indicate its status. The outputs may provide confirmation of user inputs, such as volume or radio band settings, or may indicate data derived from the audio source in use, for example CD track data or RDS data It will be appreciated that the system of FIG. 1 may be varied in numerous ways. For example, the speakers 14, 15 could be replaced by or supplemented with headphones or another means of providing audible signals. Additional or different audio sources such as minidisc or DVD (digital video disc) players could be provided.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. An integrated audio reproduction system comprising:
   a sound generation apparatus;
   audio source devices of different types for reproducing audio information;
   a single integrated circuit comprising:
      a single digital signal processor;
      a plurality of dedicated hardware units configured for communicating a plurality of channels of audio data, the dedicated hardware units including a serial interface configured to permit communication between the single digital signal processor and multiple ones of the audio source devices; and
      a bus configured to interconnect the single digital signal processor and the plurality of dedicated hardware units; and
   a serial controller in communication with the serial interface and including an input configured to receive command signals initiated by the single digital signal processor and supplied from the serial interface, the serial controller operable to produce, in response to the command signals, control signals that are transmitted to the multiple ones of the audio source devices to control audio reproduction operation of the multiple ones of the audio source devices.

2. The integrated audio reproduction system as claimed in claim 1, wherein the single integrated circuit further comprises:
   a radio data system configured to extract radio data system data from radio signals.

3. The integrated audio reproduction system as claimed in claim 1, wherein the audio source devices comprise a radio receiver, a cassette player/recorder, or a combination of the radio receiver and the cassette player/recorder.

4. The integrated audio reproduction system as claimed in claim 1, wherein the audio source devices comprise a compact disc player, a digital video disc player, an MP3 player, a minidisc player, or a combination of two or more of the compact disc player, the digital video disc player, the MP3 player, and the minidisc player.

5. The integrated audio reproduction system as claimed in claim 1, wherein the sound generation apparatus comprises an amplifier and a sound generator.

6. The integrated audio reproduction system as claimed in claim 5, wherein the amplifier is an analogue amplifier and the single integrated circuit includes a digital to analogue converter.

7. The integrated audio reproduction system as claimed in claim 6, wherein the digital to analogue converter is provided on the single integrated circuit.

8. The integrated audio reproduction system as claimed in claim 6, wherein the digital to analogue converter is provided on a second integrated circuit.

9. The integrated audio reproduction system as claimed in claim 1, wherein the audio source devices include multiple analogue source devices producing analogue audio signals, and the single integrated circuit further comprises a pre-processing section connected to the analogue source devices, the pre-processing section being configured to process in the analogue domain the analogue audio signals.

10. The integrated audio reproduction system as claimed in claim 9, wherein the single integrated circuit further comprises the pre-processing section.

11. The integrated audio reproduction system as claimed in claim 9, wherein the pre-processing section is provided on a second integrated circuit.

12. The integrated audio reproduction system as claimed in claim 1, wherein the serial controller includes a plurality of status stores for storing control statuses of the multiple ones of the audio source devices, wherein the control statuses change based on the command signals initiated by the single digital signal processor, and wherein the control statuses are supplied as the control signals to the multiple ones of the audio source devices.

13. The integrated audio reproduction system as claimed in claim 1, wherein the single digital signal processor is further arranged to:
   receive the audio information from the audio source devices; and
   perform frequency equalization on the audio information.

14. The integrated audio reproduction system as claimed in claim 13, wherein the single digital signal processor is further configured to equalize radio signal frequencies for radio signal shaping.

15. The integrated audio reproduction system as claimed in claim 13, wherein the single digital signal processor is further configured to equalize frequencies for cassette tape signal shaping.

16. The integrated audio reproduction system as claimed in claim 15, wherein one of the audio source devices is a cassette deck that is capable of sensing the type of a cassette in the cassette deck, and wherein the single digital signal processor is further configured to equalize frequencies based on the cassette tape.

17. The integrated audio reproduction system as claimed in claim 1, wherein the single integrated circuit further comprises:
   a compact disc processing subsystem configured to decode bistream data.

18. The integrated audio reproduction system as claimed in claim 1, wherein one of the audio source devices is a cassette deck capable of recording audio signals derived from digital signals supplied from the single digital signal processor.

19. The integrated audio reproduction system as claimed in claim 1, wherein the single digital signal processor is operable under software control.

20. The integrated audio reproduction system as claimed in claim 1, wherein:
   one or more of the audio source devices produces bitstream data;
   the single integrated circuit further comprises an error correction accelerator; and
   the single digital signal processor is further configured to correct errors in the bitstream data using the error correction accelerator.

21. The integrated audio reproduction system as claimed in claim 20, wherein the single digital signal processor further performs de-interleaving of decoded data derived from the bistream data using two or more buffers, wherein the single digital signal processor cannot access a buffer of the two or more buffers while being written by the decoded data and can access any of the two or more buffers not being written by the decoded data.

22. The integrated audio reproduction system as claimed in claim 1, wherein the single integrated circuit includes the serial controller.

23. A method of controlling audio reproduction operation of audio source devices of an integrated audio reproduction system, the integrated audio reproduction system comprising a digital signal processor, a serial interface and a serial controller, the method comprising:
   initiating command signals at the digital signal processor that are communicated to the serial interface;
   supplying the command signals from the serial interface to the serial controller;
   producing control signals at the serial controller in response to reception of the command signals;
   transmitting the control signals from the serial controller to multiple ones of the audio source devices, the control signals controlling audio reproduction operation of the multiple ones of the audio source devices; and
   communicating audio information reproduced from the multiple ones of the audio source devices to the digital signal processor, the digital signal processor processing the audio information to produce audio output signals.

* * * * *

UNITED STATES PATENT AND TRADEMARK OFFICE
CERTIFICATE OF CORRECTION

PATENT NO. : 8,010,214 B2
APPLICATION NO. : 10/291988
DATED : August 30, 2011
INVENTOR(S) : Brennan Page 1 of 1

It is certified that error appears in the above-identified patent and that said Letters Patent is hereby corrected as shown below:

Column 1, line 2, below Title insert -- PRIORITY DATA --.

Column 11, line 39, in Claim 17, delete "bistream" and insert -- bitstream --.

Column 12, line 16, in Claim 21, delete "bistream" and insert -- bitstream --.

Signed and Sealed this
Seventh Day of February, 2012

David J. Kappos
*Director of the United States Patent and Trademark Office*